US009915504B2

United States Patent
Andorn et al.

(10) Patent No.: US 9,915,504 B2
(45) Date of Patent: Mar. 13, 2018

(54) GATED CONJUGATION LASER

(71) Applicant: ISRAEL AEROSPACE INDUSTRIES LTD., Lod (IL)

(72) Inventors: Michael Andorn, Holon (IL); Raphael Levy, Petah Tikva (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 0 days.

(21) Appl. No.: 14/898,896

(22) PCT Filed: Jun. 17, 2014

(86) PCT No.: PCT/IL2014/050549
§ 371 (c)(1),
(2) Date: Dec. 16, 2015

(87) PCT Pub. No.: WO2014/203250
PCT Pub. Date: Dec. 24, 2014

(65) Prior Publication Data
US 2016/0370149 A1    Dec. 22, 2016

(30) Foreign Application Priority Data
Jun. 17, 2013   (IL) .......................... 226991

(51) Int. Cl.
F41G 3/00   (2006.01)
F41G 3/14   (2006.01)
F41G 7/22   (2006.01)
H01S 3/10   (2006.01)

(52) U.S. Cl.
CPC ............ *F41G 3/145* (2013.01); *F41G 7/226* (2013.01); *F41G 7/2293* (2013.01); *H01S 3/10076* (2013.01)

(58) Field of Classification Search
CPC ........ F41G 3/145; F41G 7/226; F41G 7/2293; F41G 7/2266; F41G 7/2273
See application file for complete search history.

(56) References Cited

U.S. PATENT DOCUMENTS

| 4,102,572 A | 7/1978 | O'Meara |
| 4,231,534 A | 11/1980 | Lintell et al. |
| 4,614,913 A | 9/1986 | Honeycutt et al. |
| 4,664,518 A | 5/1987 | Pfund |
| 4,837,769 A | 6/1989 | Chandra et al. |
| 4,853,528 A | 8/1989 | Byren et al. |
| 5,224,109 A | 6/1993 | Krasutsky et al. |

(Continued)

FOREIGN PATENT DOCUMENTS

WO    WO 96/30732    10/1996

OTHER PUBLICATIONS

International Search Report and Written Opinion from International Application No. PCT/IL2014/050549 dated Oct. 7, 2014.

(Continued)

*Primary Examiner* — Stephen Johnson
(74) *Attorney, Agent, or Firm* — Dorsey & Whitney LLP

(57) ABSTRACT

The presently disclosed subject matter includes a laser system, comprising with a phase conjugation laser receiver and transmitter (PCLRT) and at least one processing unit and configured to enable simultaneous designation of multiple platforms each to a respective target.

20 Claims, 8 Drawing Sheets

(56) References Cited

U.S. PATENT DOCUMENTS

| | | | |
|---|---|---|---|
| 5,273,236 | A | 12/1993 | Wootton et al. |
| 5,285,461 | A | 2/1994 | Krasutsky et al. |
| 5,351,250 | A | 9/1994 | Scott |
| 5,738,101 | A | 4/1998 | Sappey |
| 6,115,123 | A | 9/2000 | Stappaerts et al. |
| 6,961,171 | B2 | 11/2005 | Byren et al. |
| 8,217,375 | B2 | 7/2012 | Keegan et al. |
| 8,452,569 | B2 * | 5/2013 | Brown .................. F41G 7/001 250/203.2 |
| 9,212,869 | B1 * | 12/2015 | Boardman ............ G01S 13/726 |
| 2002/0153497 | A1 | 10/2002 | Pepper et al. |
| 2010/0002743 | A1 | 1/2010 | Markov et al. |

OTHER PUBLICATIONS

Markov, et al. "System concept and some characteristics of the coupled-cavity laser system for active target tracking." International Symposium on Optical Science and Technology. International Society for Optics and Photonics, 2002.

Schäfer, C. A., Matoba, O., & Kaya, N. (Feb. 2007). Tracking system by phase conjugation for laser energy transmission. In Lasers and Applications in Science and Engineering (pp. 64540A-64540A). International Society for Optics and Photonics.

Frederic, Y. M., & Bodiansky, M. (1990). Study of a phase conjugation device for pointing and tracking applications. La Recherche Aerospatiale (English Edition)(ISSN 0379-380X), No. 6, 1990, p. 37-48. DRET-sponsored research., 6, 37-48.

Kawakami, K., Uchida, S., & Okamura, H. (2012). Evaluation of tracking ability of a phase conjugate mirror using a CCD array and spatial light modulator for optical energy transmission. Applied optics, 51(10), 1572-1580.

Havrilla, David of Trumpf, Inc., entitled "Laser-Based Manufacturing in the Automotive Industry", University of Virginia, Nov. 2010.

Tomov, I. V., Fedosejevs, R., McKen, D. C. D., Domier, C., & Offenberger, A. A. (1983). Phase conjugation and pulse compression of KrF-laser radiation by stimulated Raman scattering. Optics letters, 8(1), 9-11.

Kmetik, V., Yoshida, H., Fujita, H., Nakatsuka, M., & Yamanaka, T. (Apr. 2000). Very high energy SBS phase conjugation and pulse compression in fluorocarbon liquids. In Advanced High-Power Lasers and Applications (pp. 818-826). International Society for Optics and Photonics.

Markov, V. B., & Khizhnyak, A. (2002). Adaptive laser system for active remote object tracking. In Aerospace Conference Proceedings, 2002. IEEE(vol. 3, pp. 3-1445). IEEE.

Khizhnyak, A., Markov, V., Millerd, J., & Zel'dovich, B. (May 2000). Adaptive laser tracking using phase-conjugate coupled resonators. In Lasers and Electro-Optics, 2000.(CLEO 2000). Conference on (p. 41). IEEE.

* cited by examiner

```
                    ┌─────────┐
                    │ Fig. 3a │
                    └────┬────┘
                         │
                         ▼
┌───────────────────────────────────────────────────────────┐
│                                                           │
│              At the intercepting platform:                │
│                                                           │
│   ┌───────────────────────────────────────────────────┐   │
│   │  Receiving the energy reflected from the target 326│  │
│   └───────────────────────┬───────────────────────────┘   │
│                           ▼                               │
│   ┌───────────────────────────────────────────────────┐   │
│   │ Determining whether the PRI of the received signals│  │
│   │    coincide with a respective pulse series 324     │  │
│   └───────────────────────┬───────────────────────────┘   │
│                           ▼                               │
│   ┌───────────────────────────────────────────────────┐   │
│   │ Homing to target based on the identified pulse series│ │
│   │                        330                         │   │
│   └───────────────────────────────────────────────────┘   │
└───────────────────────────────────────────────────────────┘
```

Fig. 3b

GATED CONJUGATION LASER

FIELD OF THE INVENTION

This invention relates to designation of targets with the help of a laser signal.

BACKGROUND OF THE INVENTION

Designating targets using laser spots is a widely known technique due to the high precision of the pointing laser device and the relatively low cost of the homing head (seeker). For example, the seeker can be mounted on an intercepting platform, such as a missile, and utilize the energy reflected from a target illuminated with a laser beam, for generating steering commands and homing the intercepting platform towards the target.

Using laser signals for designating an intercepting platform towards a single target is known to be very effective. However, in some cases multiple intercepting platforms must be designated simultaneously towards multiple respective targets (for example in case of an incoming missile barrage). In such cases an area is protected by an air defense system comprising detection and tracking system operable to detect and track incoming threats (e.g. missiles) connected to a missile firing system which is operable to fire at least one countering missile towards any one of the incoming threats. Generally, multiple laser designators are required, each operable to accurately designate a specific target and home a respective countering missile towards that target. The laser spot of each laser signal, used for designating a certain target, is accurately pointed to the body of a respective target in order to ensure that sufficient energy is reflected back from the target towards the intercepting platform to enable homing on the target. Such operations require a complex and expensive laser system which evidently suffer from a number of drawbacks. For example, the sights of the laser designator and the detection system (e.g. radar system and/or optical tracker) must be calibrated (e.g. in an accuracy of at least approximately 200 micro radians) and the required minimal size of the target projection is constrained by the pointing accuracy of the designation system and the divergence of the laser designator.

Thus, there is a need in the art for improved method and systems for designating targets.

GENERAL DESCRIPTION

According to one aspect of the presently disclosed subject matter there is provided a laser system, comprising: a laser illuminator, a phase conjugation laser receiver and transmitter (PCLRT) and at least one processing unit; the PCLRT comprising a laser amplifier and a phase conjugation mirror;

the at least one processing unit is configured to obtain information in respect of one or more targets; and responsive to obtaining said information, to enable the generation of a modified laser signal characterized by an average pulse repetition frequency (PRF) which equals to a basic average PRF of a given original laser signal multiplied by at least N, N ≥ the number of targets; the modified laser signal comprising at least N pulse series; and to assign a respective pulse series to each of at least part of the N targets;

the laser illuminator is configured to transmit the modified signal towards the N targets; the PCLRT is configured to receive a reflection of said modified signal, reflected from at least the identified targets; said reflection comprising a reflection set for each given pulse in the modified laser signal; each reflection set comprising at least N pulse reflections, each reflected from a different target (or some other object in the illuminated area);

the PCLRT is further configured to perform gating for at least one reflection set, in order to allow, one pulse reflection, reflected from a given target, to be amplified by the amplifier, reflected by the phase conjugation mirror and returned in the direction of the given target.

The system according to the presently disclosed subject matter can optionally comprise one or more of the following features, in any desired combination or permutation:

I. Wherein the modified laser signal comprises a pulse set in each PRI (pulse rate interval) of the original laser signal, the pulse set comprising at least N pulses and wherein each pulse series is associated with a different $i^{th}$ pulse in each pulse set.

II. Wherein each pulse series is characterized by a different group of alternating PRI values which enables to uniquely identify each pulse series.

III. Wherein all pulse series are characterized by the same average PRI value.

IV. Wherein the gating is controlled by the at least one processing unit configured to synchronize between the time of transmission of a given pulse and time of arrival of a respective reflection set, based on the distance to the given target.

V. Wherein the gating is controlled by the at least one processing unit based on the order of arrival of the pulse reflections in each reflection set.

VI. Wherein the laser system further comprises a target detection unit configured to identify the one or more targets.

VII. Wherein the laser system is operatively connected to a counter attack system, the laser system being operable to communicate with the counter attack system for allocating at least one target to a respective intercepting platform, the information including a pulse series assigned to the at least one target; and to launch said intercepting platform towards said at least one target.

VIII. Wherein the laser beam of the illuminator is a wide beam for illuminating all targets in the uncertainty area and with sufficient energy to be reflected and received by the PCLRT.

IX. Wherein the laser system further comprising beam shaping optics enabling to generate a laser beam characterize by a beam profile, that ensures a substantially constant minimal received signal reflected from the illuminated target.

X. Wherein the laser system does not make use of a stabilizing system for enabling accurate illumination of the target According to another aspect of the presently disclosed subject matter there is provided a method of laser designation, comprising:

obtaining information in respect of one or more identified targets; generating a modified laser signal characterized by an average PRF which equals to a basic average PRF of a given original laser signal multiplied by at least N, N ≥ the number of identified targets; the modified laser signal comprising at least N pulse series; assigning a respective pulse series to each of at least part of the N targets; transmitting the modified signal towards the N identified targets; receiving a reflection of said modified signal, reflected from at least the identified targets; said reflection comprising a reflection set for each given pulse in the modified laser signal; each reflection set comprising at least N pulse reflections including N pulse reflections each reflected from a different target;

for at least one reflection set:

allowing one pulse reflection, reflected from a given target, to be reflected by the phase conjugation mirror; amplifying the one pulse reflection, and returning an amplified signal, reflected from the phase conjugation mirror, directed towards the given target; the amplified signal comprising sufficient energy for the intercepting platform to track and home on to the given target.

According to another aspect of the presently disclosed subject matter there is provided a machine-readable memory tangibly embodying a program of instructions executable by the machine for executing the method of laser designation, the method comprising:

obtaining information in respect of one or more identified targets;

generating a modified laser signal characterized by an average PRF which equals to a basic average PRF of a given original laser signal multiplied by at least, N≥the number of identified targets; the modified laser signal comprising at least N pulse series; assigning a respective pulse series to each of at least part of the N targets; transmitting the modified signal towards the N identified targets; receiving a reflection of said modified signal, reflected from at least the identified targets; said reflection comprising a reflection set for each given pulse in the modified laser signal; each reflection set comprising at least N pulse reflections including N pulse reflections each reflected from a different target;

for at least one reflection set:

allowing one pulse reflection, reflected from a given target, to be reflected by the phase conjugation mirror; amplifying the one pulse reflection, and returning an amplified signal, reflected from the phase conjugation mirror, directed towards the given target.

The system, method and program storage device according to the different aspect of the presently disclosed subject matter mentioned above can optionally comprise one or more of the features (i-x) above, in any desired combination or permutation mutatis mutandis.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3b is a flowchart illustrating an example of sequence of operations performed by an intercepting platform, in accordance with the presently disclosed subject matter.

Figure 1:
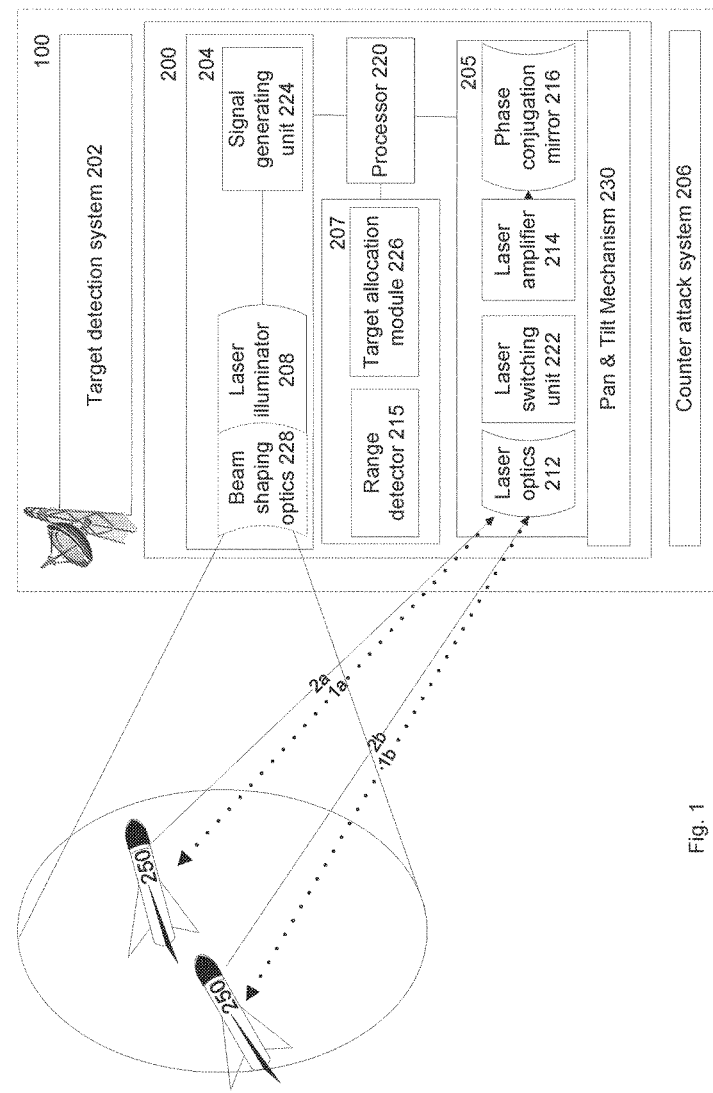
FIG. 1 is a functional block diagram schematically illustrating an example of a laser system, in accordance with the presently disclosed subject matter.

It is noted that the drawing are not drawn to scale.

DETAILED DESCRIPTION

As used herein, the phrase "for example," "such as" and variants thereof describing exemplary implementations of the present invention are exemplary in nature and not limiting.

Figure 6:
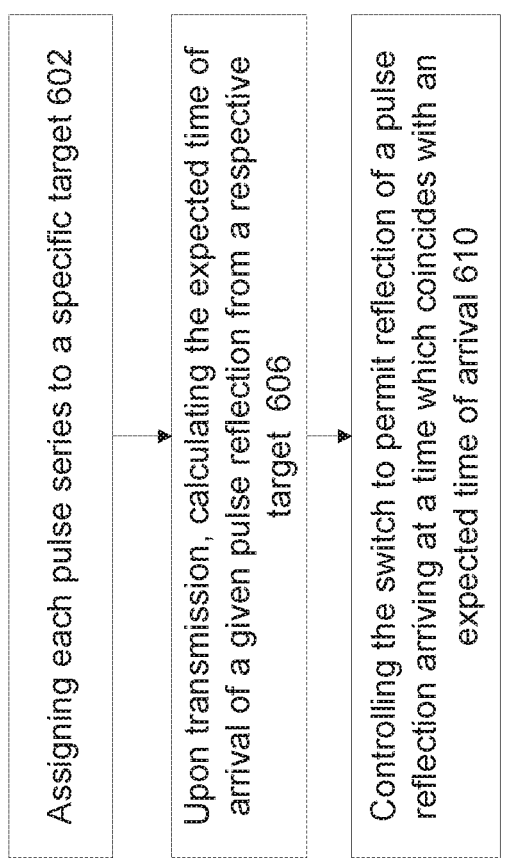
FIG. 6 is a flowchart illustrating an example of a sequence of operations performed, in accordance with the presently disclosed subject matter.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the invention will now occur to the reader. In embodiments of the invention, fewer, more and/or different stages than those shown in FIG. 2. FIG. 3a, FIG. 3b and FIG. 6 may be executed. In embodiments of the invention one or more stages illustrated in FIG. 2. FIG. 3a, FIG. 3b and FIG. 6 may be executed in a different order and/or one or more groups of stages may be executed simultaneously. FIG. 1 illustrates a schematic of the system architecture in accordance with embodiments of the invention. Each module in FIG. 1 can be made up of any combination of software, hardware and or firmware that performs the functions as defined and explained herein. The modules in FIG. 1 may be centralized in one location or dispersed over more than one location. In other embodiments of the invention, the system may comprise fewer, more and or different modules than those shown in FIG. 1.

Bearing the above in mind, attention is now drawn to FIG. 1 showing a functional block diagram schematically illustrating an example of a laser system 100, in accordance with the presently disclosed subject matter. Unlike prior art laser intercepting systems, system 100 is operable to designate one or more targets while using a wide angle laser beam which does not accurately designates each target. The term "wide angle" as used herein is meant to include an angle which is wide enough to illuminate the entire area where targets are expected to be. Thus, the required angle is a function of the size of the uncertainty area where targets are expected to be detected. This is different than previously known laser designation systems which use a narrow laser beam which accurately illuminates a given target. According to one non-limiting example it is provided that the angle of laser beam as disclosed herein can be between 1 to 5 degrees wide.

Laser system 100 comprises laser illuminating and designating system 200 operatively connected to a counter attack system 206. Counter attack system can be for example, a missile firing system comprising one or more missile batteries or any other type of countering weapon system. Laser illuminating and designating system 200 comprises laser illuminator unit 204, phase conjugation laser receiver/transmitter (PCLRT) 205, controller unit 207, one or more computer processors 220, and line of sight (LOS) direction assembly that can be implemented for example by a pan and tilt mechanism 230. Unit 204 and unit 205 can be mounted either on one pan and tilt mechanism or on two separated pan and tilt mechanisms.

Laser system 100 is operable to obtain target information including the number and location (including distance) of one or more identified targets. Optionally system 100 can also include a target detection system 202 (e.g. a radar system) operable to scan a predefined area and detect and track identified targets in the area. Alternatively or additionally, detection and tracking of targets can be performed autonomously by laser illuminating and designating system 200.

Autonomous target acquisition can be performed with the help of illuminator unit 204 and controller unit 207. To this end the system's LOS is moved (with the help of the pan and tilt mechanism 230) in a predefined search pattern and illuminator 208 and range detector 215 can be used for generating target track files.

Laser illuminator unit 204 is configured to project a wide laser beam (generated for example by signal generating unit 224) to illuminate with the laser beam a predefined area. By using a wide laser beam, rather than a narrow and accurate laser beam, the laser beam can illuminate a wider area and simultaneously hit multiple targets located within the illuminated area. However, a wide laser beam is characterized by relatively lower fluence (energy on target in a given area) than narrow and accurate beams which are typically used for designating targets. Accordingly, the energy which is reflected from an incoming target is insufficient for tacking and homing by an intercepting platform (e.g. intercepting missile) on to a respective target. Furthermore, since only one signal is being used, in case multiple targets are detected, it does not allow guiding a specific intercepting platform to a specific target. A solution for these problems is disclosed herein.

Identified targets (e.g. missiles 250 or aircrafts) which enter the illuminated area are impinged by the wide laser beam, and part of the laser energy is reflected from the targets back towards the PCLRT 205 in laser designating system 204.

PCLRT 205 comprises laser optics 212 including for example a telescope, laser amplifier 214, directed towards the phase conjugation mirror 216. The energy reflected from a target which enters PCLRT 205 hits mirror 216 and reflected back towards the target through amplifier 214 and optics 212. PCLRT 205 also comprises a laser switching unit 222 which enables gating in order to control the reception and/or transmission of signals responsive to an appropriate command. The laser signal which is reflected from a given target and received by PCLRT 205 is amplified by laser applier 214 (e.g. once on the way in and once more on the way out after it is reflected from mirror 216) to increase the laser energy and is then reflected from phase conjugation mirror 216.

As known in the art a phase conjugation mirror produces a phase conjugation effect in which the propagation direction and phase variation of a beam of light is exactly reversed. Thus, in accordance with the presently disclosed subject matter, optical phase conjugation is harnessed in order to reflect the amplified laser signal-reflection back to its source target.

Once the number of identified targets is either known or expected signal generation unit 224 can derive a modified laser signal based on this information. The laser seeker of an intercepting platform is designed to respond to a signal (herein "original signal") characterized by a predefined basic average PRF (having a unique pulse repetition interval (PRI) distribution over the signal). Responsive to reception of information indicative of the number of identified targets, signal generating unit 224 is configured to multiply the basic average PRF of the original signal by a number which is at least the number of identified targets and generate a modified signal with a multiplied average PRF. Assuming for example a the original signal is characterize by a basic average PRF of 100 Hz and three targets are indentified, the basic average PRF, used by illuminator unit 204, can be multiplied by three to generate a modified laser signal with an average PRF of 300 Hz.

Thus, each pulse in the original signal is replaced by a pulse set of N pulses, where N is equal or greater than the number of identified targets. As explained in more details below the modified signal includes at least N identifiable pulse series, each series is associated with the $i^{th}$ pulse in each pulse set of N pulses. While the PRF of the modified laser signal is multiplied, the operating PRF of the seeker of the intercepting platforms is not changed. Thus, the modified laser signal now contains a pulse series for tracking and homing each of the identified targets, each pulse series characterized by the same average PRI (PRF=1/average PRI) of the basic average working PRF of the intercepting platforms.

Target allocation unit 226 is configured to assign to each target a specific pulse series. Each intercepting platform is allocated to a respective target and is provided with the identifying information of the pulse series assigned to the respective target.

As explained above, the reflected laser signal is received by PCLRT 205 which is configured to reflect an amplified and accurate signal towards the source of the received reflection i.e. one of the identified targets.

The modified signal which is generated by signal generator 224 is projected by laser illuminator 208 and is reflected from all targets. Each pulse in each pulse set generates M pulse reflections, one pulse reflection returning from each target. Note that in some cases M=N, but this is not always the case (for example in case bird enters the illuminated area and generates an additional reflection M>N). In the following discussion M or more reflections in a single pulse is referred as a "reflection set".

For each reflection set, comprising M pulse reflections, which is received by PCLRT 205, laser illuminating and designating system 200 is configured (e.g. with the help of laser switching unit 222) to allow the reflection of only one pulse reflection back from PCLRT 205 to a respective source target. Thus, a pulse reflection from the M pulse reflections of a received reflection set is accurately returned from PCLRT 205 to the source target.

For each reflection set in N reflection sets, laser illuminating and designating system 200 is configured to allow PCLRT 205 to return a different $i^{th}$ pulse reflection. Thus for N reflection sets (resulting from N respective pulses) one instance of each $i^{th}$ pulse reflection is accurately returned to its source target. Laser illuminating and designating system 200 can be configured to synchronize between the transmitted pulses and the signal reflection which is returned by PCLRT 205.

The presently disclosed subject matter is based on the assumptions that each incoming target is located at a different distance from laser illuminating and designating system 200. A laser pulse which is transmitted from laser illuminating and designating system 200 (with the help of laser illuminator unit 204) hits the targets according to their distance, where the closest target is hit first and consequently the first to be received at PCLRT 205, the second closest target is hit second and received second at PCLRT 205, the third closets is hit third and received third at PCLRT 205 and so forth. Thus, based on the distance of the targets from laser illuminating and designating system 200 the pulse reflections in a reflection set can be associated with the respective target from which it was reflected.

In each reflection set, the pulse reflection which arrives first at PCLRT 205 is returned from the closest target, the pulse reflection which arrives second at PCLRT 205 is returned from the second target and so forth. Thus the order of arrival the pulse reflections can be associated with their corresponding target and pulse series.

According to one example, switching unit 222 in PCLRT 205 can be configured to open (e.g. and allow entrance of a pulse reflection) at a time which coincides with the arrival time of a given pulse reflection, in a reflection set, which is reflected from a given target. The given target can be identified based on the order of arrival of the pulse reflection.

According to another example, processing unit in laser illuminating and designating system 200 can be configured to record the time a pulse is transmitted, calculate the time of flight (TOF) of the pulse to the target and back to laser illuminating and designating system 200 and instruct switching unit 222 in PCLRT 205 to open at a time which coincides with the expected arrival time of a given reflection, in a reflection set, which is reflected from a given target, which can be calculated based on the distance of the target from laser illuminating and designating system 200.

The pulse reflection is accurately reflected from PCLRT 205 towards the source target and from the source target to the intercepting platform. As mentioned above, each pulse series is characterized by an average PRI and respective PRF which is equal to the basic working average PRI and respective PRF of the intercepting platforms. Furthermore, as explained in more details below, each pulse series is identifiable by a group of PRIs distinguishable by alternating temporal intervals. Thus, each intercepting platform can identify the pulse series which is reflected from its assigned target and use these signals for tracking and homing on its respective target. It should be noted that the irradiance ratio of PCLRT 205 and illuminator unit 204 should enable the intercepting platform to ignore reflections resulting from unit 204.

One advantage of the presently disclosed laser system is that, unlike previously known laser systems, it does not necessitate a stabilization system. Prior art laser system requires an accurate and expensive stabilization system to enable accurate illumination of the target. The presently disclosed laser system on the other hand does not require such stabilization system as the phase conjugation effect directs the signals to the targets.

Figure 2:
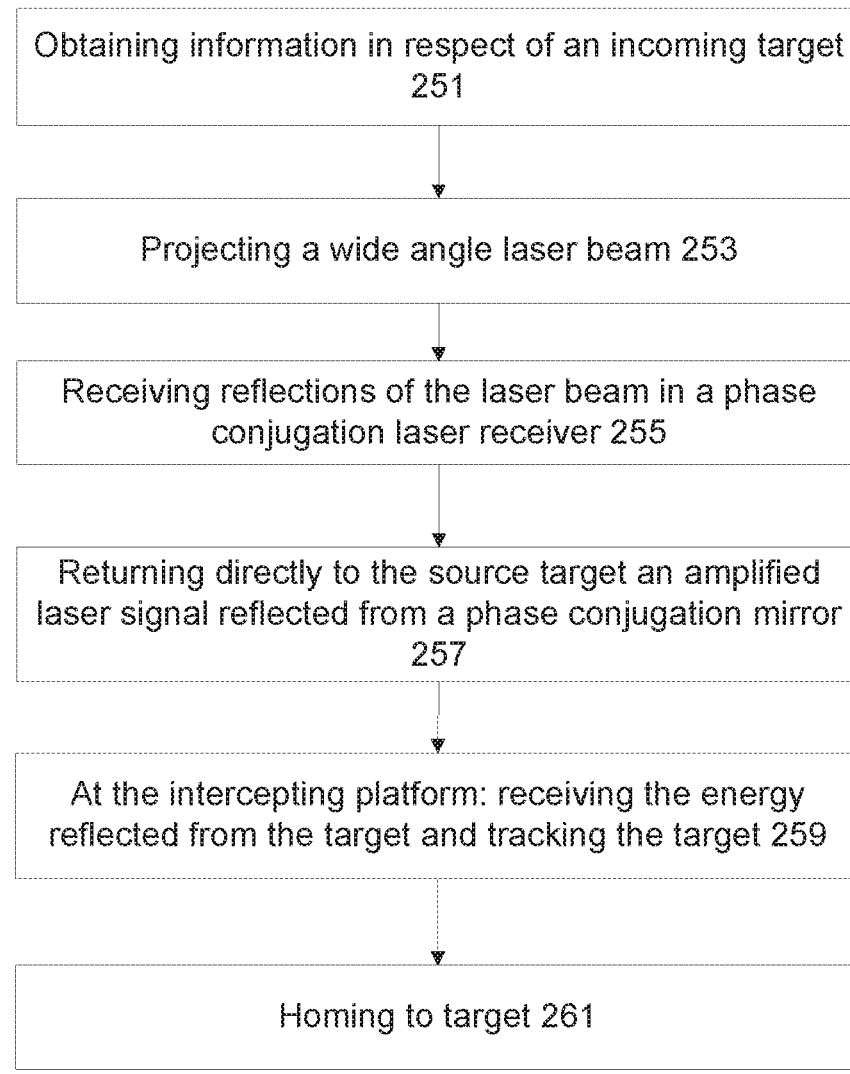
FIG. 2 is a flowchart illustrating an example of a sequence of operation performed during interception of a single target, in accordance with the presently disclosed subject matter.
Figure 3A:
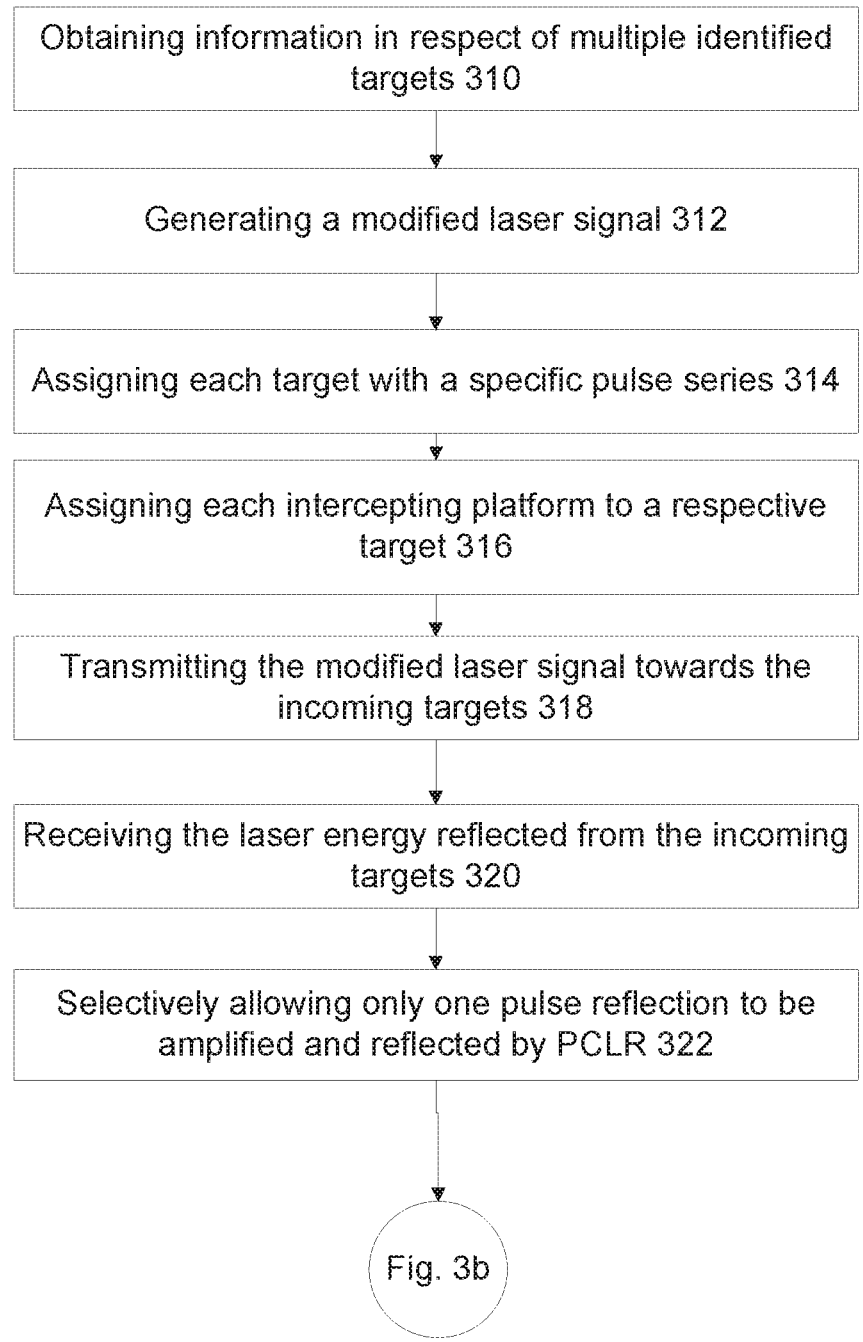
FIG. 3a is a flowcharts illustrating an example of sequence of operations performed by system 200 during interception of a multiple targets, in accordance with the presently disclosed subject matter.

FIG. 2 is a flowchart illustrating an example of a sequence of operation performed during interception of a single target, in accordance with the presently disclosed subject matter. Operations described with reference to FIG. 2 can be executed for example, by laser illuminating and designating system 200 described above with reference to FIG. 1.

At block 251, information in respect of an incoming target is obtained. As explained above, this information can be obtained with the help of target detection system 202 or directly by laser illuminating and designating system 200. FIG. 2 refers to a scenario where a single target is identified.

A wide angle pulsed laser beam is projected by a laser illuminator (block 253). The pulsed laser beam impinges on the incoming target and is reflected back towards system 200. The pulse reflection is received by a phase conjugation laser receiver/transmitter (block 255). The received pulse reflection is amplified at the entrance to the PCLRT and returned by a phase conjugation mirror to the source target (block 257). The retuned signal can be amplified once more at the exit from the PCLRT when it travels back from the phase conjugation mirror towards the source target.

Unlike the laser signal which is projected by the laser illuminator (208) the amplified retuned signal which is reflected by the phase conjugation laser system is specifically directed to the incoming target. Furthermore, this signal is amplified and therefore is characterized by sufficient fluence (energy on target) for tracking and homing on the target.

An intercepting platform which is launched (e.g. from counter attack system 206) towards the incoming target receives the laser energy of the amplified beam, which is reflected from the incoming target (block 259) and utilizes this reflection for tracking and homing on the target (block 261). The laser beam which is transmitted by the laser illuminator can be identified by the intercepting platform e.g. based on predefined temporal PRI distances.

Note that the in addition to the target other objects can be located within the area which is being illuminated by the laser illuminator (e.g. a friendly aircraft or a bird). Thus, a reflection set comprising more than one reflection can be returned towards system 200. In order to discriminate between multiple reflections, the presently disclosed subject matter makes use of switching unit 222 in PCLRT 205 which is configured to enable gating and allow entrance of a pulse reflection at a time which coincides with the arrival time of a given pulse reflection. Thereby only a desired pulse reflection enters PCLRT 205 and is amplified and returned towards the target.

FIG. 3 is a flowchart illustrating an example of a sequence of operation performed during interception of multiple targets, in accordance with the presently disclosed subject matter. Operations described with reference to FIG. 3 can be executed, for example, by laser illuminating and designating system 200 described above with reference to FIG. 1.

At block 310 information in respect of multiple identified targets is obtained at system 200. As explained above, this information can be obtained with the help of target detection system 202 or directly by laser designating and intercepting system 200. Once the number of identified targets is known a modified laser signal is generated based on this information in intercepting system 200 (block 312). The modified laser signal can be generated for example by signal generating unit 224 in intercepting system 200.

According to one example, the modified laser signal is generated by multiplying the average PRI of the original signal by the number of detected targets (or in some cases a greater number), thus the modified laser is characterized by multiplied average PRF. Accordingly, each pulse in the original signal is multiplied to create a set of N pulses, where N equals to at least the number of identified targets.

Figure 4:
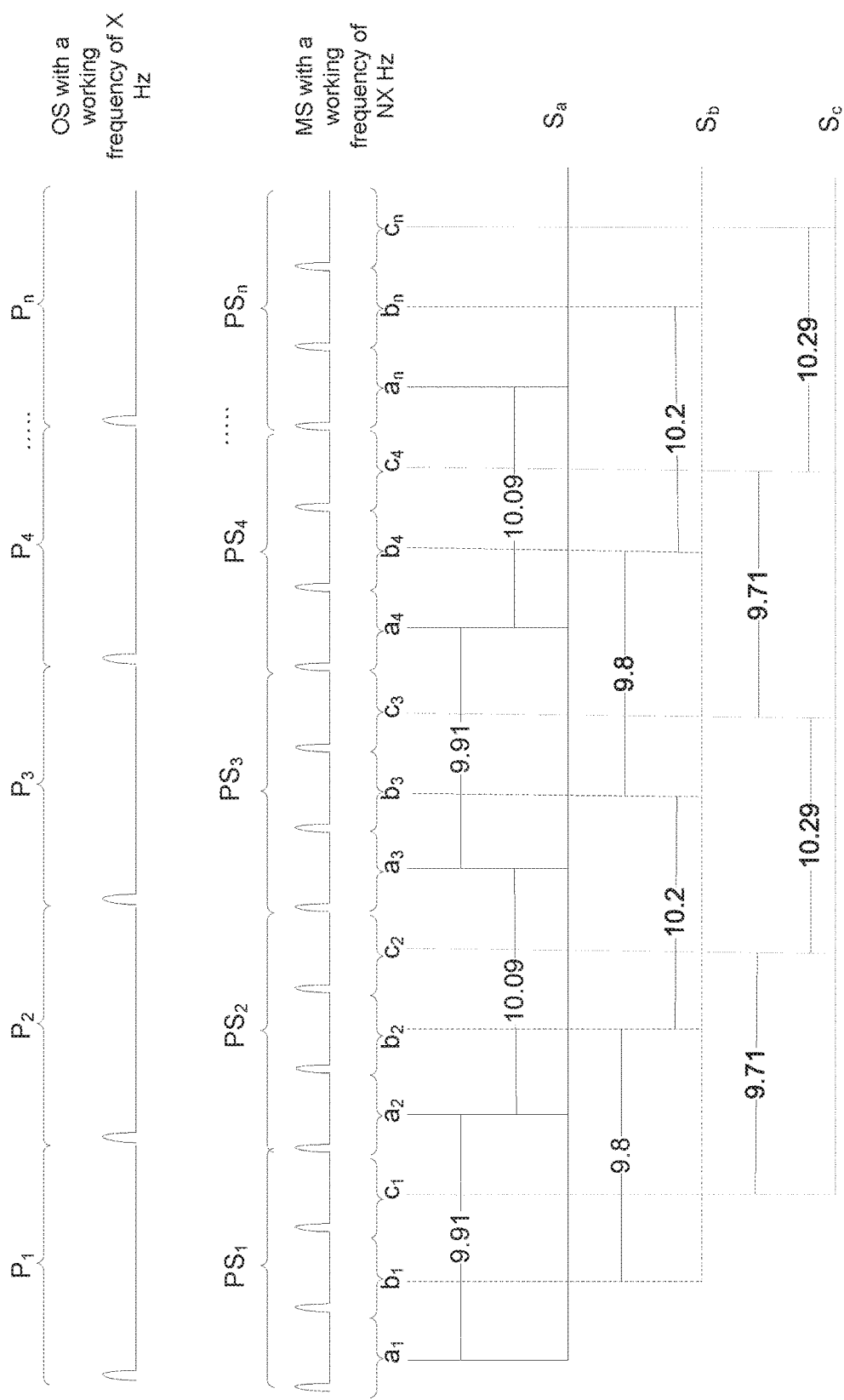
FIG. 4 is a schematic illustration demonstrating an example of a modified laser signal, in accordance with the presently disclosed subject matter.

FIG. 4 is a schematic illustration exemplifying the modification of the original laser signal, in accordance with the presently disclosed subject matter. FIG. 4 illustrates a waveform (OS) representing the original laser signal which is used by laser illuminating and designating system 200 and a respective counter attack system (e.g. 206). Assuming for example the basic average working PRF used in the original signal is 100 Hz and three targets are identified, the basic average PRF of the original signal is multiplied by three to generate a modified signal (MS in FIG. 4) with a PRF of 300 Hz. According to the example illustrated in FIG. 4 each pulse (denoted $P_1$-$P_n$) in the original signal OS has a corresponding pulse set in the modified signal MS (denoted as $PS_1$-$PS_n$) each comprising N pulses. The modified laser signal includes N identifiable pulse series, each series comprising the $i^{th}$ pulse in each pulse set of N respective pulses. Pulse series $S_a$, $S_b$ and $S_c$ are illustrated in FIG. 4. Each pulse series is associated with a corresponding $i^{th}$ pulse in each pulse set. Series $S_a$ comprises pulses $a_1$-$a_n$; Series $S_b$ comprises pulses $b_1$-$b_n$; and Series $S_c$ comprises pulses $c_1$-$c_n$.

While the average PRF of the modified laser signal is multiplied, the average operating PRF of the seeker of each intercepting platform has not been changed. Thus, the modified laser signal now contains a pulse series for tracking and homing each of the incoming targets, each pulse series characterized by the same average operational PRF as the intercepting platform.

According to the presently disclosed subject matter, in order to enable to distinguish between the different pulse series the modified signal is generated such that each pulse series is assigned with a group of PRIs characterized by alternating temporal distances between each pair of $I^{th}$ pulses in consecutive pulse sets.

Referring to series $S_a$ a first PRI exists between pulse $a_1$ and pulse $a_2$ (e.g. 9.91 milliseconds) and a second PRI exists between pulse $a_2$ and pulse $a_3$ (e.g. 10.09 milliseconds). Then again the PRI between pulse $a_3$ and pulse $a_4$ is equal to the first PRI and the PRI between $a_4$ and $a_n$ is equal to the second PRI and so forth throughout the entire pulse series.

In order to enable to distinguish between pulses associated with different pulse series each pulse series is assigned with a group of different PRIs (e.g. by signal generator 224).

Thus, in the current example, the PRIs assigned to pulse series $S_a$ is 9.91 and 10.09 milliseconds; the PRIs assigned to pulse series $S_b$ is 9.8 and 10.2 milliseconds; the PRIs assigned to pulse series $S_c$ is 9.71 and 10.29 milliseconds.

Note that in order to avoid overlap between pulses associated with different pulse series the PRI values in each group of PRIs assigned to each pulse series have the same average value and are approximately evenly distributed with the basic average PRI.

Returning to FIG. 3, each target of the multiple identified targets is assigned with a specific pulse series of the N pulse series (block 314). Thus, in the example in FIG. 5, pulse series $S_a$ can be assigned to a first target, pulse series $S_b$ can be assigned to a second target and pulse series $S_c$ can be assigned to a third target.

Each intercepting platform (e.g. missile) is assigned with a respective target (block 316). In order to assign an intercepting platform to a respective target, the intercepting platform can be provided with information indicative of the group of PRI values assigned to the pulse series of a respective target. This can be accomplished for example with the help of target allocation module 226 which can be configured to communicate with counter attack system 206 and provide to each intercepting platform the PRI values assigned to its respective target.

The modified signal (MS) is transmitted towards the multiple identified targets (block 318). Similarly to the original laser signal the modified laser signal is projected by a laser illuminator (e.g. laser illuminator 208) in a wide pulsed laser beam.

The modified signal impinges on all the identified targets and the signal energy is reflected back and received by PCLRT 205 (block 320). As all pulses in a given pulse set impinge on all the identified targets, a reflection set comprising M pulse reflections (M being the number of identified targets and any other object which may be located in the illuminated area) is received at PCLRT 205 for each pulse in a pulse set.

For each reflection set in N reflection sets, a different $i^{th}$ pulse reflection is returned by PCLRT 205. Thus for N reflection sets (resulting from N respective pulses) one instance of each $i^{th}$ pulse reflection is amplified and accurately returned to its source target (block 322).

As explained above, processing unit in laser illuminating and designating system 200 can be configured to control switching unit 222 to allow only one pulse reflection to enter PCLRT 205 and prevent the entry of other pulse reflections. Alternatively, instead of selectively blocking the incoming pulse reflections at the entrance to the PCLRT, control switching unit 222 can be configured to selectively block the reflection of the pulse reflection from the phase conjugation mirror at the exit from the PCLRT.

As mentioned above the original signal is not necessarily multiplied by exactly the number of identified targets and in some cases N can equal a number which is greater than the number of identified targets. For example, laser illuminating and designating system 200 can be configured, responsive to receiving information in respect of the number of identified targets, to multiple the original signal by a number which is greater than the number of identified targets. This provides one or more additional pulse series which are available in case additional targets are suddenly detected. The spare pulse series can be immediately assigned to the newly detected targets without additional processing of the signal. This is different than the option of reprocessing the signal each time a new target is identified. According to one example, responsive to identification of one or more targets a modified signal is generated irrespective of the number of identified targets (e.g. the modified signal can be generated such that the maximal number of targets can be designated i.e. comprising the maximal number of pulse series) and each of the pulse series is assigned to a respective target as the targets are being detected.

Furthermore, in case a target is no longer available (e.g. it was destroyed or otherwise lost) the modified signal can be either modified once more to comprise less pulse series or alternatively, the modified signal can remain as it is with one or more pulse series which are not assigned. Additionally, it is noted that more than one pulse series can be assigned to the same target, e.g. in case it is desired to launch multiple intercepting platforms towards a single target. Similarly, more than one intercepting platform can be assigned with the same pulse series.

Figure 5:
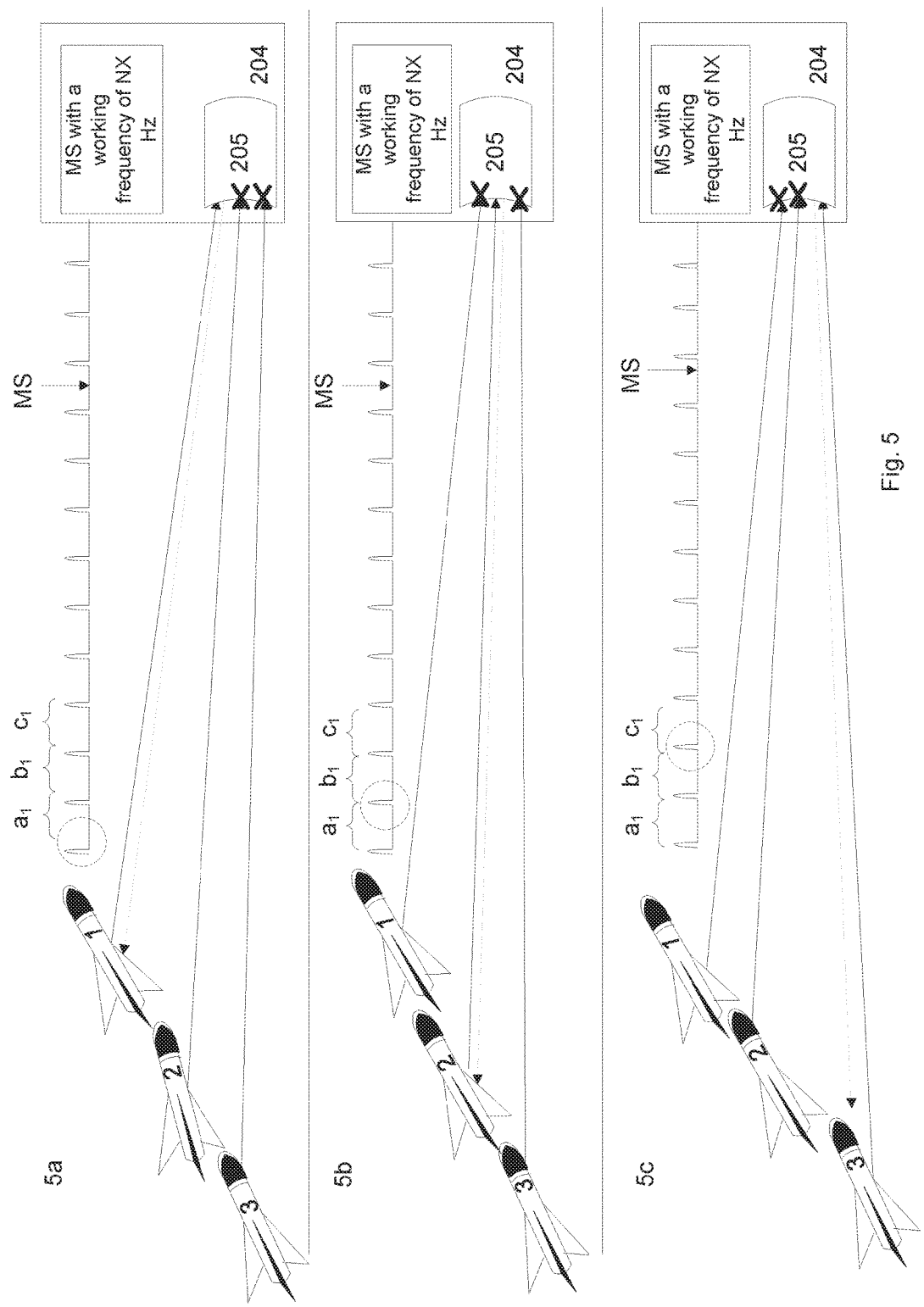
FIG. 5 is a schematic illustration exemplifying some operations of laser illuminating and designating system 200 when intercepting 3 targets, in accordance with the presently disclosed subject matter.

FIG. 5 is a schematic illustration exemplifying the operation of laser illuminating and designating system 200, in accordance with the presently disclosed subject matter. It is noted that the details provided in FIG. 5 are for the sake of example only and should not be construed as limiting in any way.

FIG. 5a to FIG. 5c all show a modified signal (MS) which is being transmitted by laser illuminating and designating system 200, in this case, towards three identified targets. Pulses associated with pulse set $PS_1$ are identified in the figure as a, b and c. Note, that the three targets are located at different distances from laser illuminating and designating system 200.

In FIG. 5a the first pulse (pulse a) of the modified signal hits all three targets and a reflection set comprising 3 pulse reflections is returned towards laser illuminating and designating system 200. In laser illuminating and designating system 200 only one of the 3 pulse reflections is reflected by PCLRT 205. This pulse is amplified (twice) in PCLRT 205 and returned to the source target.

Assuming that that pulse series $PS_1$ which comprises pulse $a_1$, is assigned to the closest target, processing unit in laser illuminating and designating system 200 is configured to control the laser switch and thereby allow only the pulse reflection retuning from this target to enter PCLRT 205. See in FIG. 5a only the pulse reflection returning from target 1 is reflected back to the target and the two other pulse reflections are not reflected by PCLRT (indicated by the two crosses).

In FIG. 5b pulse $b_1$, assigned to target 2, is returned from the 3 targets towards the laser system. Processing unit in laser illuminating and designating system 200 is configured to control the laser switch to allow only the pulse reflection retuning from target 2 to be returned by PCLRT 205. See in FIG. 5a only the pulse reflection returning from target 2 is reflected back to the target.

In FIG. 5c pulse $c_1$, assigned to target 3, is returned from the 3 targets towards the laser system. Processing unit in laser illuminating and designating system 200 is configured to control the laser switch allow only the pulse reflection retuning from target 3 to be returned by PCLRT 205. See in FIG. 5a only the pulse reflection returning from target 3 is reflected back to the target.

This process is repeated for each pulse set thereby providing each intercepting platform with the respective pulse series assigned for tracking a respective target.

Turning to FIG. 3b, the amplified energy of the singled out pulse is reflected to the source target and then reflected again from the source target to all the intercepting platforms (block 326). Each intercepting platform comprises a signal processing unit which is configured to determine the PRIs between consecutive incoming pulses. In case the PRIs matches the PRIs which characterize the pulse series assigned to the respective target (assigned to the intercepting platform) the intercepting platforms uses the reflected laser energy for tracking and homing on the target. The intercepting platform continues to receive the signal reflections from the targets and is configured to select those reflections which are characterized by a PRI which coincides with the expected PRI of the assigned pulse series. This enables the intercepting platform to identify its assigned pulse series and use that part of the modified signal for homing onto its assigned target.

FIG. 6 is a flowchart illustrating an example of operation performed by laser illuminating and designating system 200 in accordance with the presently disclosed subject matter. As mentioned above laser switch 222 is configured to control PCLRT 205 such that only one pulse reflection for a given reflection set of N pulse reflections is transmitted back towards the targets. According to the non-limiting example illustrated in FIG. 6 processing unit in laser illuminating and designating system 200 is configured to synchronize between a transmitted laser pulse and the received pulse reflection. Processing unit (e.g. with the help of signal generator 224) in laser illuminating and designating system 200 is configured to control the transmission of pulses.

At block 602 each one of at least part of the pulse series in a modified signal is associated with a respective target. Upon transmission of a given pulse, associated with a given pulse series, the processing unit is configured to calculate the expected time of arrival of the pulse reflection, reflected from the respective target assigned to the given pulse series (block 606). As explained above, laser illuminating and designating system 200 is provided with information indicating the number of identified targets and the distance to each target. Processing unit can be configured to calculate the expected time of arrival of a pulse reflection, reflected from a respective target e.g. based on the distance of the target.

Processing unit is then configured to measure the time from the transmission of the given pulse, associated with a given pulse series, and control the switch to allow reflection of the pulse reflection by PCLRT 205 at a time that coincides with the expected time of arrival of the pulse reflection returning from the respective target (block 610). Thus, only a pulse reflection retuning from the respective target is reflected by PCLRT 205 and accurately returned to the respective targets. Other pulse reflections arrive at different times, and the switching does not permit them to be reflected by PCLRT 205. The operations described with reference to blocks 606 and 610 are repeated upon the transmission of each pulse which is associated with a pulse series which is associated with a respective target.

According to another example, processing unit does not synchronize the switching unit with an expected time of arrival of a respective pulse reflection. Targets are assigned with pulse series according to their distance. Responsive to transmission of the first pulse M pulse reflections (a reflection set) are received at laser system. However, since different targets are located at different distances from the laser system, different pulse reflections in a reflection set arrive at different times according to the respective distance of the respective targets from the laser system. Thus, processing unit can control the laser switch to open when a pulse reflection reflected from the respective target is received.

For example, assuming the first pulse (in a pulse set of N pulses) is associated with a pulse series assigned to the closest target, processing unit is configured to control the laser switch to open, after transmission of the first pulse, once the first pulse reflection arrives and close at the time of arrival of other pulse reflections. If the second pulse (in a pulse set of N pulses) is associated with a pulse series assigned to the second closest target, processing unit is configured to control the laser switch to open, after transmission of the second pulse, once the second pulse reflection arrives and so forth.

The presently disclosed subject matter is directed, inter alia, for detection tracking and interception of multiple targets. As explained above, a wide laser beam is used for illuminating a plurality of approaching targets. The energy of the wide laser beam must be sufficient for illuminating all targets and generate pulse reflections with sufficient energy to be detected back at the laser system.

The farther the targets are from the laser system the greater is the energy of the laser beam which is required in order to enable detection and tracking. As the targets get closer the required energy is reduced. Furthermore, the farther are the targets the narrower is the illumination angle which is required in order to capture all targets. As the targets get closer the required illuminating angle is increased.

Therefore, according to the presently disclosed subject matter, laser illuminator 208 can be optionally configured with a beam shaping optics 228 which is configured to generate a laser beam characters by different energy regions, wherein the energy in each region is adapted to the expected distance of the targets.

Figure 7:
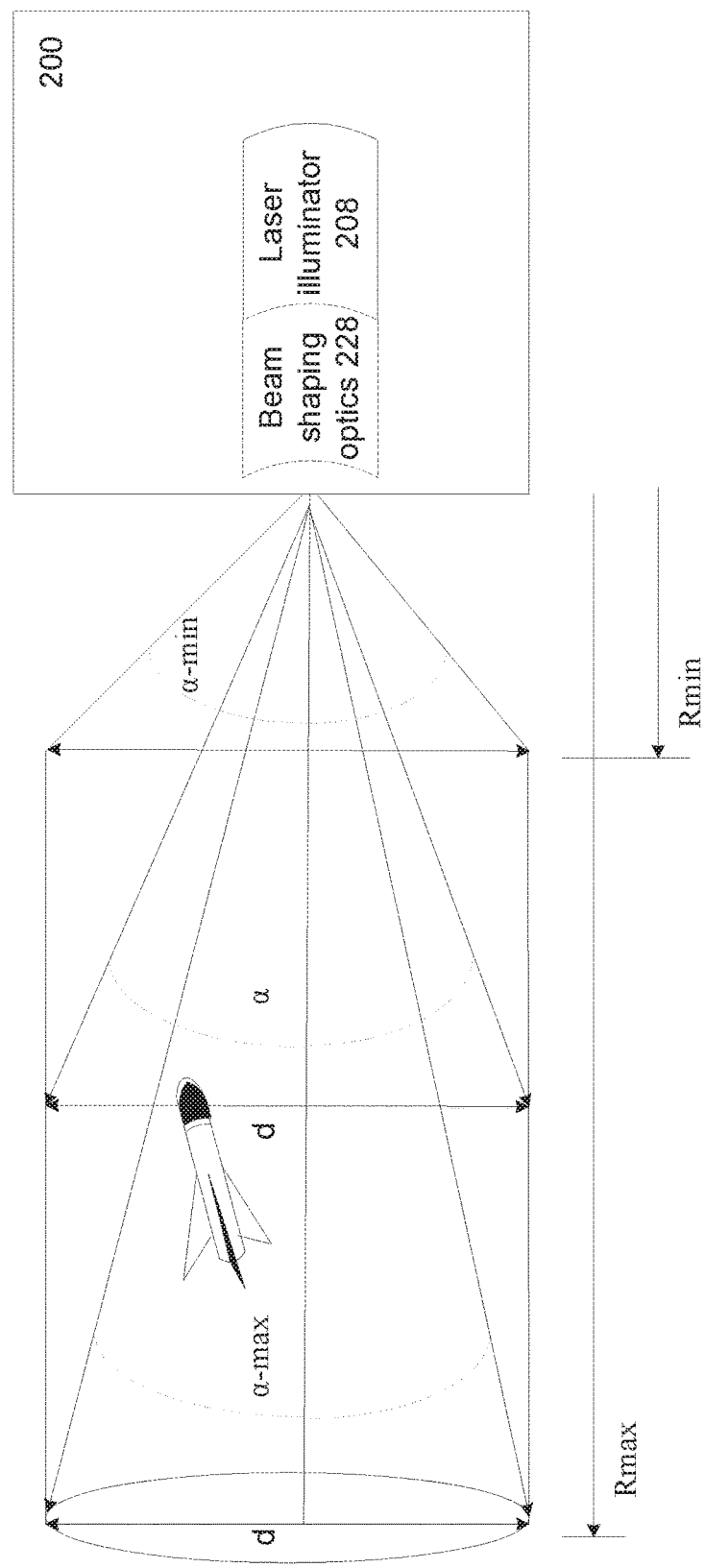
FIG. 7 is a schematic illustration showing an example of a laser beam generated in accordance with the presently disclosed subject matter.

FIG. 7 is a schematic illustration showing an example of a laser beam generated in accordance with the presently disclosed subject matter. FIG. 7 illustrates a partial view of laser illuminating and designating system 200 showing laser illuminator 208 configured with beam shaping optics 228, optimized for a scenario in which targets appear in a given uncertainty area independent of their distance from system 200. An optimal energy saving beam profile, that ensures a constant minimum received signal reflected from the illuminated target, is a profile that provides an approximately constant energy density within the spatial angle of the uncertainty area at the maximal range and a constant/$\alpha^4$ (for small angles) dependency for greater angles. This profile can be further optimized to take into account range dependency of atmospheric transmittance.

The beam shaping principle for targets that are expected at a constant uncertainty area of radius d/2 is as follows:

For $\alpha<(d/2)/R$max: $I(\alpha)\approx$constant=$Io$ (the requested minimum irradiation at the entrance to the PCLRT)

For $(d/2)/R$max$<\alpha<(d/2)/R$min: $I(a)$ is proportional to $(d/2)^4/(\alpha* R$max$)^4$ where $I(\alpha)$ is the illuminator total radiance (energy/solid angle) in direction $\alpha$.

The systems disclosed herein with reference to FIG. 1 comprises or is otherwise associated with at least one computer. The term "computer" should be expansively construed to cover any kind of electronic device with data processing capabilities, including, by way of non-limiting example, a personal computer, a server computer, a computing system, a communication device, a processing device (e.g. digital signal processor (DSP), microcontroller, field programmable gate array (FPGA), application specific integrated circuit (ASIC), etc.) or any other electronic computing device and/or combination thereof.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable computer memory (including transitory and non-transitory) tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as basis for designing other structures, methods, and systems for carrying out the several purposes of the presently disclosed subject matter.

The present invention has been described with a certain degree of particularity, but those versed in the art will readily appreciate that various alterations and modifications may be carried out without departing from the scope of the following claims.

The invention claimed is:

1. A system for laser designation, comprising:
a laser illuminator;
a phase conjugation laser receiver and transmitter (PCLRT), the PCLRT including a laser amplifier and a phase conjugation mirrors and at least one processing units;
the at least one processing unit is configured to obtain information in respect of one or more targets; and responsive to obtaining said information, to enable generation of a modified laser signal characterized by an average pulse repetition frequency (PRF) that is equal to a basic average PRF of a given original laser signal multiplied by at least N, said N > the number of said one or more targets; the modified laser signal including at least N pulse series; and to assign a respective pulse series to each of at least part of said one or more targets;
wherein the laser illuminator is configured to transmit the modified signal towards said one or more targets;
wherein the PCLRT is configured to receive a reflection of said modified signal, reflected from at least said one or more targets; said reflection including a reflection set for each given pulse in the modified laser signal; each said reflection set including at least a plurality of pulse reflections each reflected from a different target;
wherein the PCLRT is further configured to perform gating for at least one reflection set, in order to allow, one pulse reflection from a plurality of pulse reflections of said at least one reflection set, reflected from a given target, to be amplified by the amplifier, reflected by the phase conjugation mirror and returned in a direction of the given target.

2. The system according to claim 1 wherein the modified laser signal includes a pulse set in each PRI (pulse rate interval) of the original laser signal, the pulse set including at least N pulses, and wherein each of said pulse series is associated with a different $i^{th}$ pulse in each said pulse set.

3. The system according to claim 2 wherein each pulse series is characterized by a different group of alternating PRI values which enables to uniquely identify each pulse series, and wherein all pulse series are characterized by a same average PRI value.

4. The system according to claim 1 wherein the gating is controlled by the at least one processing unit configured to synchronize between a time of transmission of a given pulse and a time of arrival of a respective reflection set, based on any one of:
distance to the given target; or
order of arrival of the plurality of pulse reflections in each of said reflection set.

5. The system according to claim 1, further comprising a target detection unit configured to identify and provide the information in respect of the one or more targets.

6. The system according to claim 1 being operatively connected with a counter attack system, the system being operable to communicate with the counter attack system for allocating at least one target, from the one or more targets, to a respective intercepting platform, and provide information including a pulse series, from the at least N pulse series, assigned to the at least one target; and to launch said intercepting platform towards said at least one target.

7. The system according to claim 1 wherein said amplifier is configured to amplify said one pulse reflection, once upon entrance to the PCLRT and once upon exit of the PCLRT.

8. The system according to claim 1 wherein the illuminator is configured to transmit the modified signal as a wide beam for illuminating all targets in an uncertainty area and with sufficient energy to be reflected and received by the PCLRT.

9. The system according to claim 1, further comprising beam shaping optics enabling to generate a laser beam characterize by a beam profile, that ensures an approximately minimum constant received signal reflected from an illuminated target.

10. The system according to claim 1 wherein the one pulse reflection, amplified and returned in the direction of the given target, is characterized by sufficient energy for enabling an intercepting platform to track and home on the given target.

11. A laser designation method, comprising:
obtaining information in respect of one or more targets;
generating a modified laser signal characterized by an average pulse repetition frequency (PRF) that is equal to a basic average PRF of a given original laser signal multiplied by at least N, said N ≥ the number of said one or more targets; the modified laser signal including at least N pulse series;
assigning a respective pulse series to each of at least part of said one or more targets;
transmitting the modified signal towards said one or more targets;
receiving a reflection of said modified signal, reflected from at least said one or more targets; said reflection including a reflection set for each given pulse in the modified laser signal; each said reflection set including at least a plurality of pulse reflections, each reflected from a different target; and
for at least one reflection set:
allowing one pulse reflection, reflected from a given target, to be reflected by a phase conjugation mirror;
amplifying the one pulse reflection; and
returning an amplified signal, reflected from the phase conjugation mirror, directed towards the given target; the amplified signal comprising sufficient energy for an intercepting platform to track the given target.

12. The laser designation method according to claim 11 wherein the modified laser signal comprises a pulse set in each PRI (pulse rate interval) of the original laser signal, the pulse set including at least N pulses, and wherein each of said pulse series is associated with a different $i^{th}$ pulse in each said pulse set.

13. The laser designation method according to claim 12 wherein each pulse series is characterized by a different group of alternating PRI values which enables to uniquely identify each of said pulse series, and wherein all pulse series are characterized by a same average PRI value.

14. The laser designation method according to claim 11, further comprising controlling a switch in order to allow the one pulse reflection, reflected by the given target, to be reflected by the phase conjugation mirror;
wherein the controlling is based on any one of:
synchronization between a time of transmission of a given pulse and a time of arrival of a respective reflection set, based on a distance of the given target; or
order of arrival of the pulse reflections in each of said reflection set.

15. The laser designation method according to claim 11 wherein the at least one reflection set is a reflection set of a pulse associated with a pulse series assigned to the given target.

16. The laser designation method according to claim 11, further comprising identifying said one or more targets.

17. The laser designation method according to claim 11, further comprising:
allocating at least one target, from the one or more targets, to a respective intercepting platform;
assigning to the intercepting platform a pulse series assigned to the at least one target; and
launching said intercepting platform towards said at least one target.

18. The laser designation method according to claim 11 wherein the transmitting of the modified signal includes transmitting a wide laser beam characterized by sufficient energy for tracking of targets in an uncertainty area where the targets are expected to be.

19. The laser designation method according to claim 11, further comprising generating the modified signal as a laser beam characterized by a beam profile that ensures approximately constant minimum received signal reflected from a target illuminated by the modified signal.

20. A non-transitory computer-readable memory tangibly embodying a program of instructions executable by a computer for executing a method of laser designation, the method comprising:
obtaining information in respect of one or more targets;
generating a modified laser signal characterized by an average pulse repetition frequency (PRF) that is equal to a basic average PRF of a given original laser signal multiplied by at least N, said N ≥ the number of said one or more targets; the modified laser signal including at least N pulse series;
assigning a respective pulse series to each of at least part of said one or more targets;
transmitting the modified signal towards said one or more targets;
receiving a reflection of said modified signal, reflected from at least said one or more targets; said reflection comprising a reflection set for each given pulse in the modified laser signal; each said reflection set including at least a plurality of pulse reflections each reflected from a different target; and
for at least one reflection set:
allowing one pulse reflection, reflected from a given target, to be reflected by a phase conjugation mirror;
amplifying the one pulse reflection; and
returning an amplified signal, reflected from the phase conjugation mirror, directed towards the given target.

* * * * *

UNITED STATES PATENT AND TRADEMARK OFFICE
CERTIFICATE OF CORRECTION

PATENT NO. : 9,915,504 B2
APPLICATION NO. : 14/898896
DATED : March 13, 2018
INVENTOR(S) : Michael Andorn et al.

Page 1 of 1

It is certified that error appears in the above-identified patent and that said Letters Patent is hereby corrected as shown below:

In the Claims

In Column 14, Line 4, delete "units;" and insert --unit;--, therefor.
In Column 14, Line 11, delete "N >" and insert --N ≥--, therefor.

Signed and Sealed this
Twenty-fourth Day of July, 2018

Andrei Iancu
*Director of the United States Patent and Trademark Office*